L. N. MORSCHER.
METHOD OF DETERMINING POWER TRANSMISSION.
APPLICATION FILED APR. 15, 1912.
1,123,135.
Patented Dec. 29, 1914.
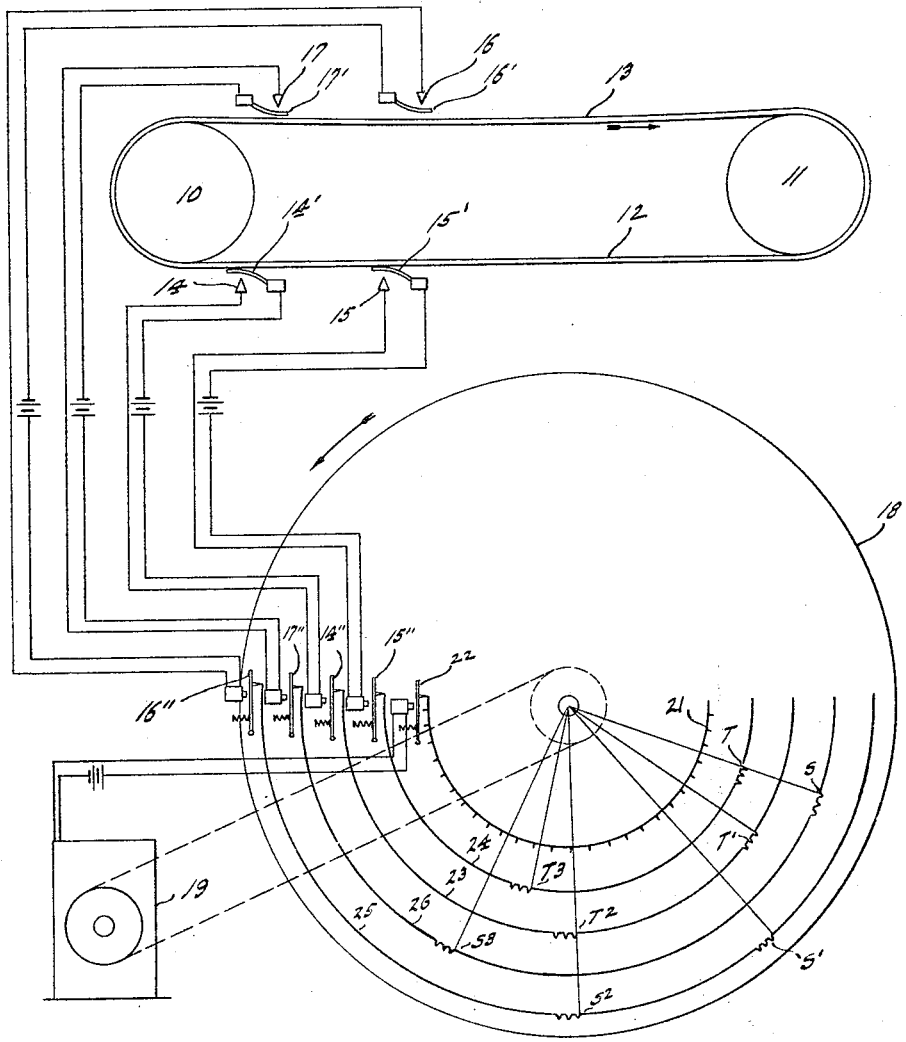
Witnesses
Frank A. Fahl
May Layden
Inventor
Lawrence N. Morscher,
By Arthur M. Hood
Attorney

UNITED STATES PATENT OFFICE.

LAWRENCE N. MORSCHER, OF LAWRENCE, KANSAS, ASSIGNOR TO HIMSELF AND IRVING HILL, A COPARTNERSHIP.

METHOD OF DETERMINING POWER TRANSMISSION.

1,123,135.  Specification of Letters Patent.  Patented Dec. 29, 1914.

Application filed April 15, 1912. Serial No. 690,952.

*To all whom it may concern:*

Be it known that I, LAWRENCE N. MORSCHER, a citizen of the United States, residing at Lawrence, in the county of Douglas and State of Kansas, have invented a new and useful Method of Determining Power Transmission, of which the following is a specification.

I have discovered a new method of determining the amount of power transmitted through a flexible transmission member, such as a belt, chain, cable, etc., through which the driving force is applied to the driven object.

It has long been known that the speed of vibration of a flexible member under tension is dependent upon the character of the material, its weight, the tension under which it is held, and its length between supports. If a driving force be applied to an object through the medium of a flexible member such as a belt, and that flexible member be transversely vibrated, the speed of travel of the vibrations lengthwise of the belt will be not only dependent upon the weight, tension and length of the belt but, in addition, the speed of vibrations traveling in the direction of transportation of the belt will be greater than the speed of travel of vibrations in the direction opposite to the direction of transportation of the belt by an amount equal to twice the velocity of transportation of the belt. Therefore, if the weight per unit length of the belt be known, its speed of transportation and its tension may be determined by a comparison of the speed of travel of lateral vibrations longitudinally of the belt. The tension of the belt, when reduced to pounds, multiplied by the velocity of transportation of the belt in feet per second, will indicate the power transmitted to the load. The speed of the lateral vibrations in the transmitting member may be determined by means of air jets deflected by the passing lateral vibrations of the belt, the air jets impinging upon small vanes which regulate electrical contacts; or by means of a beam of light cast by a mirror and controlling a selenium cell; or by direct mechanical operation of markers by the vibrating belt, etc., and the apparatus illustrated diagrammatically in the accompanying drawings is therefore presented merely as an illustration.

The accompanying drawing illustrates diagrammatically a manner of practising my method or discovery.

In the drawing, 10 and 11 indicate a driving pulley and a driven pulley, respectively, connected by a belt having a tight side 12 and a slack side 13. Arranged adjacent to the tight side 12 of the belt at points separated by a known distance are two electrical terminals 14 and 15. Arranged adjacent these terminals and normally out of contact therewith, are two terminals 14' and 15', respectively, which are interposed between the terminals 14 and 15 and the tight side 12 of the belt, conveniently trailing upon the belt. Similarly arranged adjacent the slack side of the belt are pairs of terminals 16, 16' and 17, 17' separated from each other by the same known distance as the distance of separation of the terminals 14 and 15. A record sheet 18 of any desired form is driven at a constant rate of speed by any suitable means, such, for instance, as the clock-work 19 arranged so as to transcribe a time record 21 upon sheet 18 by a marker 22 of ordinary form in circuit with the clock-work in a common manner. Arranged in circuit with the pairs of terminals 14—14', 15—15', 16—16', and 17—17' are markers 14", 15", 16" and 17", respectively, each arranged to transcribe its own particular record 23, 24, 25, and 26, respectively, upon the record sheet 18. Supposing the belt and pulleys to be in motion and the slack and tight sides of the belt to be simultaneously struck so as to laterally vibrate at initial points exactly opposite the terminals 15' and 17' (or at uniform distances therefrom on the side of the approach of the belt) the tight and slack sides of the belt will be set into lateral vibrations which will travel lengthwise of the belt. These vibrations will cause simultaneous actuation of the terminals 15' and 17' so as to produce record markings T and S, respectively, on the record sheet and these markings will be upon the same radial line. The lateral vibrations in the belt will travel toward terminals 14' and 16', respectively, and thus cause the productions of record T' and S', respectively, on the record sheet, the angular space between the records T and T' being less than the space between the records S and S' because the speed of vibration in the tight side of the belt will be greater than the speed of vibration in the slack side of the belt, due to the difference in tension, and this difference in tension will be the only cause tending to produce a difference between T and T' and S and S' because the distances between the pairs of terminals are the same, the weight of the belt per unit length is constant and the velocity of the belt for the short period required for the vibrations to travel from one pair of terminals to another may be considered constant even in cases where there is a material fluctuation in velocity of the belt. If now the tight and slack sides of the belt be struck in such manner that the vibrations will travel from one pair of terminals to the other in the direction opposite to that of the travel of the belt between the pairs of terminals, a second set of records $T^2$, $T^3$, and $S^2$, $S^3$ will be produced, the distance $T^2$, $T^3$ exceeding the distance T, $T^1$ by an amount equal to twice the velocity of the belt and the distance $S^2$, $S^3$ differing from the distance S, $S^1$ by the same amount. Comparing these readings with the time record 21, the velocity of the belt may be determined and the difference in tension between the tight and slack sides of the belt may also be determined whereupon, by multiplying the difference in tension by the velocity of the belt, the transmitted power may be determined. When the transmission of power is by direct pull through a vibratory medium (not an endless belt) the transmitted horse power will be determined by multiplying the tension of the member by its velocity of transportation.

In the manipulation of the apparatus illustrated diagrammatically in the drawing, it is not essential that the tight and slack sides of the belt be vibrated simultaneously or that the initial point of vibrations be exactly spaced with relation to the nearest set of terminals but by manipulating the apparatus in the manner described the reading of the record sheet is materially simplified.

It is also possible, by a single indicator, to determine the rate of vibration of the tight and slack sides of the belt due to the compound action of the travel of the belt and the weight, and the tension of the belt and its velocity may thus be determined, but considerable more calculation and more elaborate formulæ will be required for that purpose.

The following description and formulæ will clearly indicate the practice of my improved method:—The transverse waves of vibration in a stretched flexible member and the longitudinal or sound waves in gases and liquids travel similarly. The speed of propagation of these transverse waves may be determined by methods similar to those used to determine the velocity of sound waves provided proper means of detecting and recording the inaudible waves be used. For example, two persons standing a known distance apart in line with a fort of unknown distance, each notes the time between his seeing the flash of a cannon and his hearing the report of the cannon; the difference between these separate results giving the time required for the sound to travel past the first man to the second man, for short distances the time required for the travel of light being neglected. The time divided by the known distance gives the velocity of sound. This corresponds to the two point method in which the chronographic record shows the time required for the belt wave to travel past one recording point to another of known distance of separation. If these men be in line between two forts in action with a swift wind blowing directly from one fort to the other, the men will observe that the sound travels at a higher velocity with the wind than against it by an amount equal to twice the velocity of the wind, that is, if the wind velocity be represented by X and the sound velocity by Y, then the velocity with the wind will be Y plus X=C, while the velocity against the wind will be represented by Y minus X=D.

$$\begin{array}{ll} Y+X=C & Y+X=C \\ Y-X=D & Y-X=D \\ \hline 2X=C-D & 2Y=C+D \end{array}$$

The velocities C and D being observed, the wind velocity X and sound velocity Y become known. This corresponds to the two point method where the length of belt and speed of travel of the belt are unknown; belt speed and wave velocity being both determined from the chronograph record of waves passing each way past two detector points a known distance apart.

Another example: A man stands midway between two opposite parallel reflecting distant walls, whose distance apart is known. The man fires a shot, the sound of which is reflected past him from wall to wall at regular intervals, the echoes fom each wall passing him at coincident regular intervals, if he be midway between the walls. This corresponds to the one point method where the detector is located in the middle of the belt span between the belt wheels, a wind blowing from one wall to the other again corresponding to the belt travel. A variation is made use of where the belt is struck over a divided detector point which records both the blow and the wave reflected from the nearest supporting wheel, corresponding to an echo from a single wall. By a divided point detector I mean a detector with a finger on each side of the belt so that whichever way the belt swings it will actuate the detector. When an undivided or single finger detector is used it is only effected by waves in which the belt moves to the same side that the detector finger is on (the finger referring to the more commonly used electrical contact detectors.) This much for getting the velocity of travel of the transverse vibration. This reduced to equations becomes, for the two point method,—

$$V = \frac{V_i + V_d}{2} \text{ and } S = \frac{V_i - V_d}{2},$$

where $V_i$=the velocity of wave travel with the belt, $V_d$=velocity of wave travel against the belt, $V$=true wave velocity in the belt and $S$=the velocity of travel of the belt itself.

Example: Two detector points ten feet apart on a belt gave a record of 1/15 second of time for the wave to travel with the belt travel from one point to the other. 1/5 of a second was required for a wave to travel in the reverse direction or against the belt travel from point to point.

$$\frac{10}{1/15} + \frac{10}{1/5} = 150 + 50 = 200 = 2V.$$

$V$=100 feet per second or the rate of wave travel in the belt. $150-50=100=2S=50$ feet per second=the rate of belt travel.

For the single point method, since the time which is recorded is the sum of the times a wave requires to travel with the belt travel and return against this travel, the apparent velocity is the reciprocal of the sum of the reciprocals of the times taken to travel each way multiplied by the distance traveled. If the single point method and single finger detector is used, then only every alternate reflected wave is recorded, since the direction of swing is reversed at each reflection of wave. The time taken to travel the distance (L) from one pulley to the other pulley and back for the second reversal will be $$\frac{L}{V+S} + \frac{L}{V-S} = T_s,$$

where $V$=wave velocity, and $S$=velocity of belt travel: while $T_s$=the time required for the wave to travel over the length L and back while the belt is traveling at the velocity S. Then if L and S be measured and $T_s$ determined from the chronographic record, V can be easily calculated, or the apparent or resultant velocity $$V_a = \frac{2L}{T_s} = \frac{V^2 - S^2}{V}$$

In order to simplify this calculation, however, a set of tables might be prepared from which V, the true belt velocity may be easily obtained by proper reference to the $V_a$ and S obtained by measurements and the chronograph record as above explained.

Further:—To obtain the tension of the belt after V is obtained and W, the weight per unit length of belt, has been ascertained, it is only necessary to apply the well known formula for vibrating stretched strings:

$$V = \sqrt{\frac{F}{M}},$$

where V=wave velocity, F=tension force and M=mass per unit length of the stretched string. If F be in pounds, V in feet per second and M be in pounds of weight per foot=W then $$V = \sqrt{\frac{32.2F}{W}} \text{ or } F = \frac{V^2 W}{32.2},$$

where V is feet per second wave velocity, W=pounds per running foot weight of string or belt and F=the pounds of tension. If the belt be traveling at the velocity S, it will transmit FS foot pounds per second=$\frac{FS}{550}$ horsepow    Sets of table may be prepared also to shorten the work when V, S and W are known or have been determined. It is also possible to determine W without removing the belt to weigh it. The belt is preferably stopped and caused to vibrate by a blow near the middle of the belt span; the chronometer record of the vibration being taken. A known weight M, not many times greater nor less than the supposed weight of the entire span of belt, is then rested upon or attached to the middle of the belt which is again vibrated and the record taken as before.

From well known laws of physics I have derived and by experiments proved the correctness of the following formulæ:—

$$W = \frac{\pi^2 M}{4L\left(\frac{t^2}{T^2} - 1\right)}$$

where W=the weight per unit length of belt, M=the mass by which the belt is loaded at its middle, T is the time required for the free unloaded belt to make a complete vibration, $t$, the time required for the belt loaded at its middle with the mass M, to make a complete vibration and L is the length of free belt span. Also $$F = \left(\frac{2L}{T}\right)^2 \times \frac{W}{G},$$

or in pound, foot, second system, $$F = \left(\frac{2L}{T}\right)^2 \times 0.031 W,$$

where F=the tension in pounds.

To summarize the one point method (using the English system of units for example) determine the weight, W, of the belt in pounds per running foot, its rate of travel, S, in feet per second, the length of free belt span L between support on belt wheels then apply the belt dynamometer to get the time, T, required for a complete vibration of the belt. $\frac{2L}{T}$ will give the apparent velocity, $V_a$ of wave in the belt, use the value of $V_a$ thus found in the formula $$V_a = \frac{V^2 - S^2}{V} \text{ or } V = \frac{V_a}{2} + \sqrt{S^2 + \frac{V_a^2}{4}}$$

to find the value V, which value when found is used in the well known formula for wave motion in stretched strings, $$V = \sqrt{\frac{GF}{W}}$$

where V=wave velocity, G=value of gravity at that place, F=tension and W=weight per unit length of string, or $$F = \frac{V^2 W}{G}.$$

Then F×S=rate of work. If F be in pounds, S and V in feet per second, and W in pounds weight per running foot, then F×S will be, in feet per second, $\frac{1}{550}$ FS horsepower, much of this work, if so desired, being shortened by the use of a set of tables prepared as above mentioned.

*The two point method.*—Set the two detectors, L. feet apart against the running belt where weight, W per foot is known, strike the belt in two places so that two waves will pass the two points, one against the belt travel, the other with the belt travel, let $T_1$ and $T_2$ represent the time of travel respectively over the length L, then $$1/2\left(\frac{L}{T_i} - \frac{L}{T_d}\right) = S,$$

the feet per second the belt travels while $$1/2\left(\frac{L}{T_2} + \frac{L}{T_d}\right) = V,$$

the rate of wave travel, as in the other example the tension in pounds $$F = \frac{V^2 W}{G} = V^2 W \times .031$$

in pounds tensions, while $$V^2 W.S. \times .031$$

equals feet pounds per second rate of work or $$V^2 W.S. \times .00005636 = \text{horsepower}.$$

*Formulæ.*

$$V = \frac{L}{T} \quad \text{(Equation 1)}$$

$$T_s = \frac{L_1}{V+S} + \frac{L_1}{V-S} \quad \text{(Equation 2)}$$

$$V = \frac{V_a}{2} + \sqrt{S^2 + \frac{V_a^2}{4}} \quad \text{(Equation 3)}$$

$$V_a = \frac{2L_1}{T_s} \quad \text{(Equation 4)}$$

$$V_i = V + S = \frac{L}{T_i} \quad \text{(Equation 5)}$$

$$V_d = V - S = \frac{L}{T_d} \quad \text{(Equation 6)}$$

$$V = \frac{-S}{2} = \frac{V_i + V_d}{2} \quad \text{(Equation 7)}$$

$$S = \frac{V_i - V_d}{2} \quad \text{(Equation 8)}$$

$$V = \sqrt{\frac{GF}{W}} \quad \text{(Equation 9)}$$

$$F = \frac{V^2 W}{G} \quad \text{(Equation 10)}$$

$$F \times S = \frac{V^2 W S}{G} = \text{rate of work} \quad \text{(Equation 11)}$$

$$W = \frac{\pi^2 M}{4L\left(\frac{T^2_m}{T^2} - 1\right)} \quad \text{(Equation 12)}$$

V is the true transverse wave velocity through the stretched member. L is the distance between two points of observation along the stretched member. T is the time required for the wave to travel the distance L. $L_1$ is the length of belt span between contact on pulleys. S is the velocity at which the belt is traveling. $T_s$ is the time required for the wave to traverse the length of the belt span $L_1$ with the belt travel S and return against the belt travel S to the starting place. $V_a$ is the apparent wave velocity as determined from the equation $$\frac{2L_1}{T_s} = V_a.$$

$V_i$ is the resultant velocity through space, increased when the wave travels in the direction with the belt travel. $V_d$ is the resultant velocity when the wave travels in the reverse direction to the belt direction and is correspondingly decreased. $T_i$ is the time required for the wave to travel the length $L_1$ with the belt motion S. $T_d$ is the time required for the wave to travel the length $L_1$ against the belt motion S. G is the acceleration of gravity at location of the experiment. W is the weight per unit length of the stretched vibrating member. F is the force of tension stretching said member. M is the mass of weight by which the belt may be loaded when S is zero and it is desired to ascertain W. $T_m$ is the time of complete vibration of the belt so loaded.

*Two point method.*—In a still belt the chronograph record gives T, whence L, the distance between the two points being known, V is computed from Equation 1. W and G being known, F is computed from Equation 10. If the belt is running, $V_i$ and $V_d$ are recorded according to the last members of Equations 5 and 6 whence V and S are calculated according to Equations 7 and 8. W and G being known and V and S determined as given above, the tension on the belt can be obtained from Equation 10 or the rate of work from Equation 11. If the weight, W, per unit length of belt is not known and it is not desired to remove the belt for weighing, the standing belt of span of length $L_1$ is vibrated with a single detector near its middle to get T, the time of a complete vibration of the free span. Then a mass of known weight, M, is attached to the middle of the belt and a record of the time, $T_m$ of a complete vibration of the loaded belt taken (the tension F not having been appreciably altered) W is calculated from Equation 12.

*Single point method.*—The free length of belt span $L_1$ found, the speed of the belt travel, S, is ascertained. The chronographic record of the dynamometer gives T as found by a detector placed near the middle of the belt and Equation 4 is used to obtain $V_a$. $V_a$ and S applied to Equation 3 gives the value of V. W is known or previously found as given above for applying Equation 12. Applying the values of V and W to Equation 10 gives the tension on the belt, while V, W and S applied to Equation 11 gives the power or rate of work.

Several other methods may be used but the last described single point method is found the most practical in most cases.

If English units be used then V and S are in feet per second, W is in pounds per foot, T, $T_1$ and $T_d$, also $T_a$ are in seconds. M is in pounds weight, F is in pounds stress and FS is in foot pounds per second. While G is usually about 32.2 feet, $$\frac{FS}{550} = \text{horsepower}.$$

$.031 \ V^2W = \text{stress on belt}.$ $.00005636 \ V^2W = \text{horsepower}.$

I claim as my discovery:

1. That improvement in the art of determining the amount of power transmitted by a traveling transmitting member capable of vibration comprising the determination of the speed of travel of lateral vibrations in said transmitting member in the direction of travel, and in the direction opposite to the travel of the transmitting member.

2. That improvement in the art of determining the amount of power delivered to a driven member by an endless traveling transmitting member capable of vibration comprising the determination of the speed of travel of lateral vibrations along the tight and slack sides of the transmitting member in the direction of, and in the direction opposite to, the direction of travel of the transmitting member.

3. That improvement in the art of determining the amount of power delivered to a driven member by an endless traveling transmitting member capable of vibration comprising the determination of the speed of travel of lateral vibrations along the tight and slack sides of the transmitting member.

4. That improvement in the art of determining the amount of power transmitted by a traveling transmitting member capable of vibration, comprising producing lateral vibrations in said transmitting member, and determining the speed of travel of said lateral vibrations in opposite directions along said transmitting member.

5. That improvement in the art of determining the amount of power delivered to a driven member by an endless traveling transmitting member capable of vibration, comprising producing lateral vibrations in the tight and slack sides of the transmitting member, and determining the speed of travel of said vibrations along said tight and slack sides.

6. That improvement in the art of determining the amount of power delivered to a driven member by an endless traveling transmitting member capable of vibration, comprising producing lateral vibrations in the tight and slack sides of the transmitting member, and determining the speed of travel of said vibrations along said tight and slack sides in opposite directions.

In witness whereof, I, have hereunto set my hand and seal at Lawrence, Kansas.

LAWRENCE N. MORSCHER. [L. S.]

Witnesses:
I. J. MEADE,
ARTHUR M. HOOD.